United States Patent [19]

Berg

[11] Patent Number: 5,526,624
[45] Date of Patent: Jun. 18, 1996

[54] METHOD OF LAYING ROOFING FELT AND MEANS THEREFOR

[75] Inventor: Bo Berg, Strängnäs, Sweden

[73] Assignee: Roofer International AB, Spanga, Sweden

[21] Appl. No.: 295,863

[22] PCT Filed: Mar. 10, 1992

[86] PCT No.: PCT/SE92/00146

§ 371 Date: Oct. 13, 1994

§ 102(e) Date: Oct. 13, 1994

[87] PCT Pub. No.: WO93/18247

PCT Pub. Date: Sep. 16, 1993

[51] Int. Cl.$^6$ ....................................... E04B 2/00
[52] U.S. Cl. ............... 52/419; 52/746.1; 156/71; 156/64; 156/304.4
[58] Field of Search ............... 52/416, 417, 419, 52/746, 409, 95; 156/64, 71, 273.9, 275.1, 304.4, 304.6, 367, 378, 272.2

[56] References Cited

U.S. PATENT DOCUMENTS

| | | | |
|---|---|---|---|
| 2,193,233 | 3/1940 | Hardy | 52/416 X |
| 4,239,795 | 12/1980 | Haage et al. | 52/746 X |
| 4,313,991 | 2/1982 | Lamb | 52/417 X |
| 4,416,713 | 11/1983 | Brooks | 156/64 |
| 4,776,262 | 10/1988 | Curran | 52/95 X |
| 4,869,044 | 9/1989 | Wald | 52/746 |
| 4,870,796 | 10/1989 | Hart et al. | 52/409 |
| 5,248,864 | 9/1993 | Kodokian | 156/272.2 X |

*Primary Examiner*—Carl D. Friedman
*Assistant Examiner*—W. Glenn Edwards
*Attorney, Agent, or Firm*—Nixon & Vanderhye

[57] ABSTRACT

Roofing felt containing bitumen which is solid at ambient temperature and soft at an increased temperature is laid on roofs, the roofing felt having pieces with end edges and the method practiced by utilizing a heat emitting member in the form of a metal strip with a number of openings in it for penetration of softened bitumen. The metal strip is provided adjacent a first end edge of a first piece of roofing felt, and the first end edge of the first piece of roofing felt is overlapped with a second end edge of a second piece of roofing felt so that the metal strip engages both of them. A variable magnetic field is applied to the joint area to induce a current of sufficient strength to cause the metal strip to be heated to a temperature sufficient to soften the bitumen of both the pieces of roofing felt so that softened bitumen flows into the openings in the metal strip. After termination of the magnetic field the softened bitumen is cooled so that a tight continuous overlap joint is provided between the felt pieces. Typically while the bitumen is still softened a compression force is applied to the topmost pieces of felt to assist in forcing softened bitumen into and through the openings, such as by rolling a roller over the joint area.

26 Claims, 2 Drawing Sheets

METHOD OF LAYING ROOFING FELT AND MEANS THEREFOR

CROSS REFERENCE TO RELATED APPLICATIONS

This application is a U.S. National Phase of International Application No. PCT/SE92/00146 filed Mar. 10, 1992.

BACKGROUND AND SUMMARY OF THE INVENTION

The present invention relates to a method of laying roofing felt on roofs, said roofing felt containing bitumen which is solid at ambient temperature and softens at an increased softening temperature, in which method length of roofing felt are brought to overlap each other in overlap zones of predetermined width, and welded together by heating the bitumen to said softening temperature by means of a heat-emitting member. The invention also relates to a means for use when laying roofing felt of the type described above, said means including a heat-emitting member.

When laying roofing felt it has been usual to spread molten tar on the surface and on the edge portion of an adjacent length and then roll out the roofing felt on the tar-coated surfaces to produce overlap joints. The tar is usually heated to liquid state in a container placed on the roof, using an open flame. Due to the considerable fire risk and the fact that many extensive fires have occurred, this method entailing an open flame will in future only be permitted under personal responsibility and at great risk.

It is also known to heat bitumen with the aid of pre-heated air or a gas flame, the air of the gas flame being directed into the overlap zone while the edge of one length of roofing felt is left and then pressed down against the other edge portion as the softening process proceeds. The use of a gas flame will shortly be prohibited for the same reason as stated above. Like the method using a gas flame, the method using pre-heated air is performed at relatively low speed and in an uncomfortable working position, which may lead to uneven results.

The object of the present invention is to provide an improved method of laying roofing felt and welding together the lengths to form continuous welded seams considerably faster than said hot-air method and in a more ergonomically favorable manner.

The method according to the invention is substantially characterized in that, when the overlapping lengths are in contact with each other, an electric current is caused to pass through an electrically conduction heat-emitting member arranged within and extending continuously along the entire overlap zone, in that the heat-emitting member is supplied with energy by induction by means of an induction apparatus that emits a variable magnetic field inducing current of suitable strength in the heat-emitting member to generate heat in the heat-emitting member, said heat being emitted to at least one of the opposing portions of the lengths within the overlap zone so that the bitumen in at least said portion is brought to its softening temperature and the lengths are welded together at said opposing portions to form a tight, continuous overlap joint.

The means according to the invention is substantially characterized in that the heat-emitting member is electrically conducting so that an electric current is caused to pass through it when the overlapping lengths are in contact with each other, said heat-emitting member being arranged within and extending continuously along the entire overlap zone, said means also including at least one induction apparatus arranged to supply energy by means of induction to the heat-emitting member, said induction apparatus being arranged to emit a variable magnetic field inducing current of suitable strength in the heat-emitting member to generate heat in the heat-emitting member, said heat being emitted to at least one of the opposing portions of the lengths within the overlap zone so that the bitumen in at least said portion is brought to its softening temperature and the lengths are welded together at said opposing portions to form a tight, continuous overlap joint.

BRIEF DESCRIPTION OF THE DRAWINGS

The invention will be described further in the following with reference to the drawings.

DETAILED DESCRIPTION OF THE DRAWINGS

Figure 1:
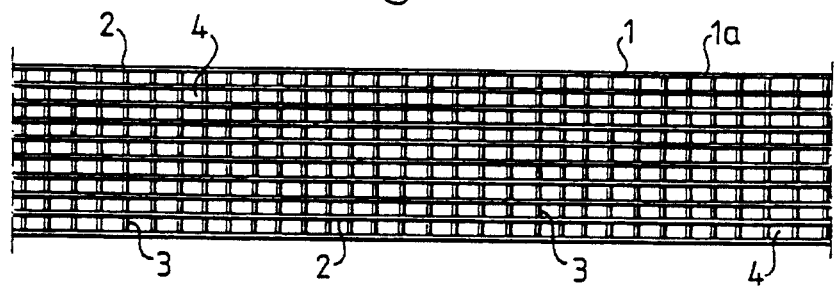
FIG. 1 shows a length of a heat-emitting member in the form of a metal net.

With reference to FIG. 1, it is shown therein a length of an electrically conducting heat-emitting member 1 which, according to the invention, is supplied with energy by means of induction. In this embodiment the heat-emitting member is in the form of netting 1a of suitable metal material. The netting is of predetermined width and consists of longitudinal and transverse wires 2, 3 connected together in suitable manner. Current passes primarily through the longitudinal wires 2, while the transverse wires 3 hold the longitudinal wires 2 together and help to distribute the heat produced. The net meshes form a large number of through-openings 4 which are extremely important since the softened bitumen can penetrate into the openings from both sides, thus producing complete adhesion of the bitumen from both lengths of roofing felt.

Figure 2:
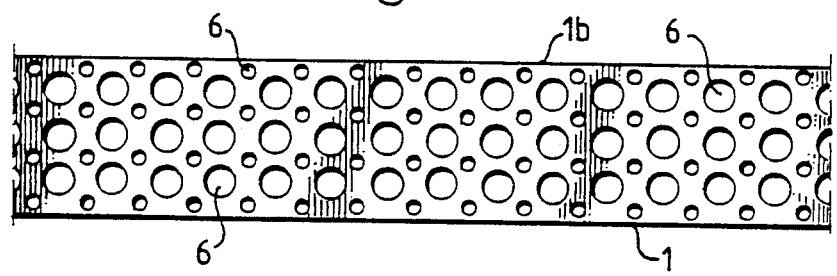
FIG. 2 shows a length of a heat-emitting member in the form of a perforated metal tape.

FIG. 2 shows another embodiment of the heat-emitting member 1 in the form of a tape 1b of suitable metal material which is perforated so that it has a large number of through-openings 6 with the same function as the openings 4 in the netting 1a.

Figure 3:
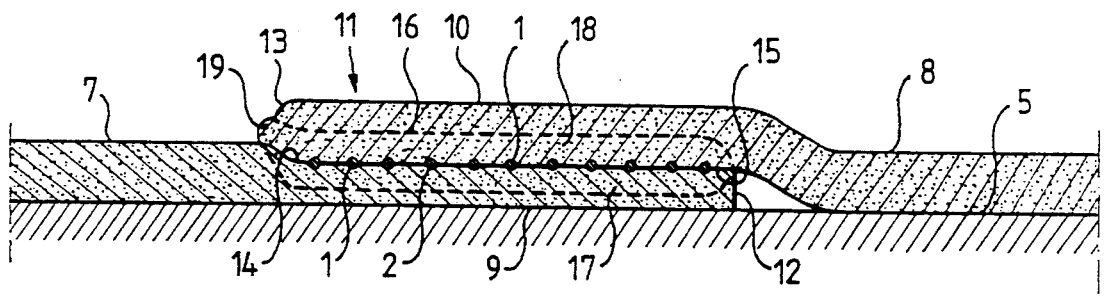
FIG. 3 shows schematically sections of two lengths in cross section through the overlap zone.

FIG. 3 shows sections of two lengths 7, 8 of roofing felt in cross section, each length 7, 8 having a first edge portion 9 and a second edge portion 10 to overlap and cooperate with second and first edges portions 10, 9, respectively, of two adjacent lengths (only two of the three lengths are thus shown in FIG. 3). The roofing felt is provided with a carrying central layer (not shown) coated on both sides with bitumen. The upper side of the roofing felt is coated with a layer of small pieces of slate, said first edge portion 9 being free from slate so that the bitumen is exposed in the same way as on the lower side of the roofing felt. The edge portion 9 has predetermined width so as to form an overlap zone 11 with the edge portion 10 of the other length. Within the overlap zone 11, between the overlapping edge portions 9, 10, is a heat-emitting member in the form of the netting 1a shown in FIG. 1, the width of the netting being adjusted to be slightly less than the width of the overlap zone 11. The netting 1a is thus entirely enclosed between the edges 12, 13 of the lengths 7, 8. The netting 1a, or other heat-emitter can be supplied separately and the desired length of netting be placed on the edge portion 9 after the length 7 of roofing felt has been laid out on the roof. However, it is preferable for the netting 1a or other heat-emitter 1 to be incorporated in the roofing felt at the time of manufacture. It may thus advantageously be secured to the slate-free bitumen surface of the edge portion 9. It may alternatively be secured to the lower side of the edge portion 10. In both cases the bitumen on the roofing felt may serve as adhesive when this has not yet solidified or has been temporarily softened after solidification. Other adhesives may be used, such as a foil carrier coated with adhesive for the netting or other heat-emitter, e.g. a plurality of metal wires without transverse wires, said foil disintegrating at the softening temperature of the bitumen. Alternatively the netting or other heat-emitter is placed inside the edge portion 9 or the edge portion 10 one or a few millimeters from its joint surface 14 or 15.

When heat is generated in the netting 1a a melt zone 16 is formed within the overlap zone, said melt zone containing opposing portions 17, 18 of both the edge portions 9, 10. When the bitumen has reached its softening temperature pressure is applied to the overlap zone, e.g. with the aid of a roller or suitable weight which is rolled over and along the overlap zone so that an upset 19 is formed, indicating that melting has occurred and thus constituting a check that a continuous, tight overlap joint has been formed.

Figure 4:
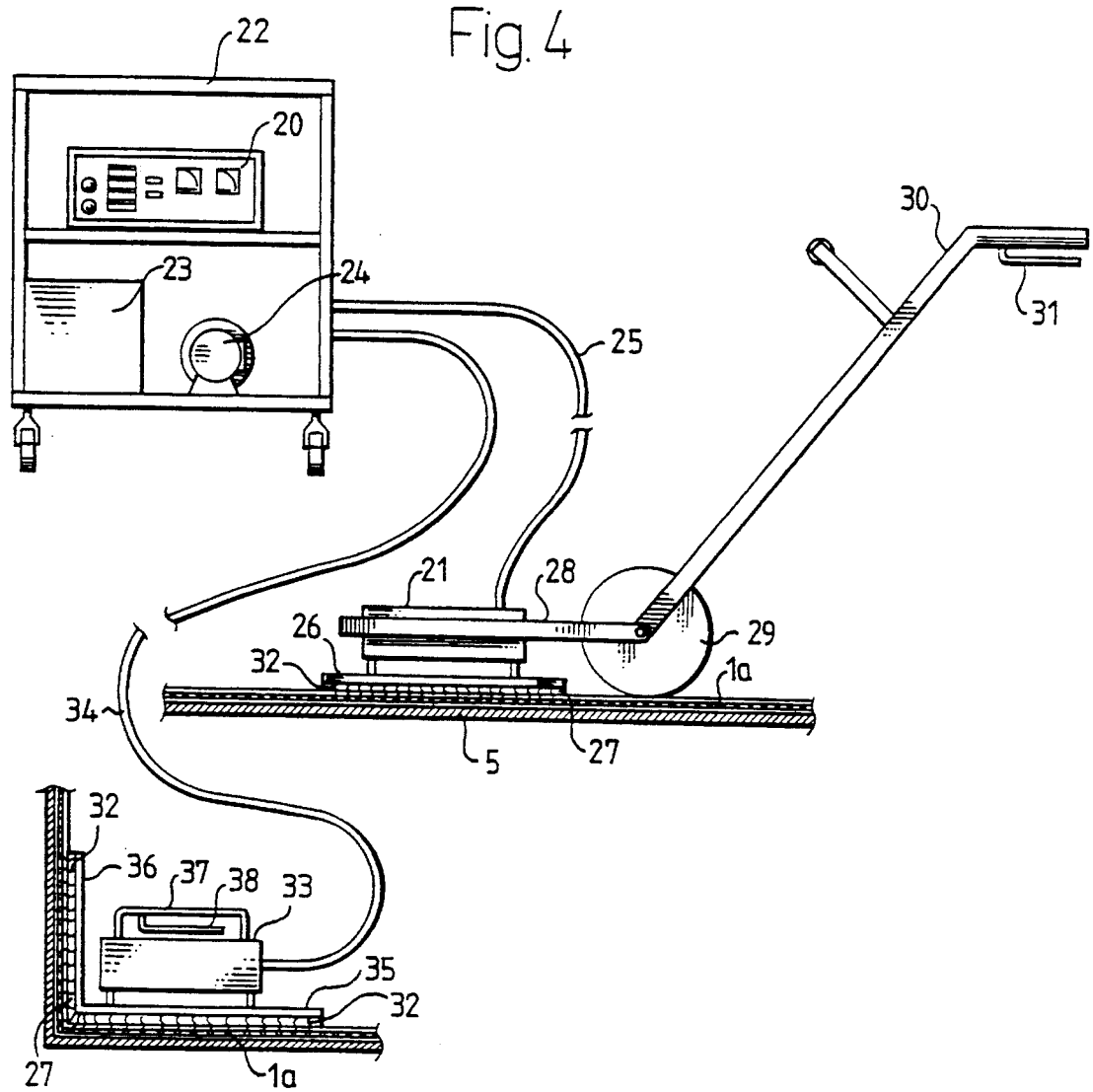
FIG. 4 shows schematically a means for welding lengths of roofing felt.
Figure 5:
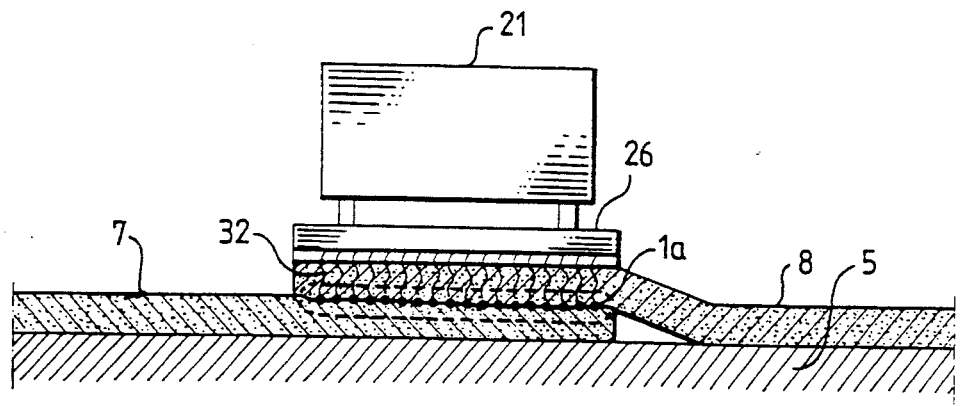
FIG. 5 shows one of two induction apparatuses used in the means according to FIG. 4 together with intermediate netting enclosed therein.

FIG. 4 shows schematically a means which can be used for laying roofing felt in the manner described above, said means comprising a heat-emitter in the form of netting 1a, a high-frequency generator 20 and a first induction apparatus 21. The generator 20 is connected to a voltage source, e.g. the existing electricity network, and is mounted on a carriage 22, the latter also carrying a water container 23 and a water pump 24. Between the carriage 22 and the induction apparatus 21 is a connection 25 containing a high-frequency cable and also hoses for circulating water between the pump 24 and the induction apparatus 21 for continuous cooling of the induction apparatus 21. The induction apparatus 21 has a flat inductor 26, the copper wires of which are protected by a lower glass-fiber sheet 27 which is designed to slide on the roofing felt. The glass-fiber sheet 27 may be of such a thickness that the distance between the copper wires and the roofing felt is 4–5 mm. The induction apparatus 21 is carried by a tool 28 with a roller 29, journalled to allow the tool 28 and its induction apparatus to be moved manually. The tool 28 is provided with a handle 30 permitting easy maneuvering of the tool and control means 31 for control of the induction apparatus. The roller 29 is sufficiently heavy to exert pressure on the softened overlap zone. The induction apparatus 21 thus supplies energy to the netting 1a by generating a variable magnetic field 32 that induces current of suitable strength in the enclosed netting for heat to be generated in the netting 1a and emitted to the bitumen in contact with the netting 1a. The means 20 is provided with suitable control equipment (not shown) to enable the melting process in the melt zone 16 (FIGS. 3 and 5) to be controlled, the control parameters being the temperature of the roofing felt prior to heating, the quality of the roofing felt (blown or distilled bitumen which have different softening temperatures) and the size of the melt zone 16.

The means according to FIG. 4 also includes a second induction apparatus 33 connected to the carriage 22 by a connection 34 in the same way as the first induction apparatus 21. The second induction apparatus 33 is portable and is primarily intended for use in places where the roofing felt is folded up against wall sections such as transitions or roof edges.

For this purpose the inductor consists of a flat horizontal part 35 and a flat vertical part 36. The induction apparatus is provided with a handle 37 and a control device 38. Alternatively the upwardly directed inductor 36 may be adjustable so that the angle can be regulated and adjusted to the angle between the roof and said upwardly directed transition or roof edge.

The supply of energy to the heat-emitter 1 can be regulated by temperature measurement. In this case one or more temperature gauges is/are placed in, beside or on top of the overlap zone and the welding process is controlled on the basis of the temperature(s) registered by the gauge(s). Combining temperature measurement inside the overlap zone with temperature measurement on top of the overlap zone enables control of the extent of the melt zone 16. It is important during the welding that the melt zone does not reach the upper side of the overlap joint as this would cause the slate coating to be destroyed by the bitumen exuding. It is also important that the melt zone 16 is not too small which might lead to insufficient adhesion and poor tightness.

The method according to the invention is also applicable when splicing the ends of two lengths of roofing felt. The end of one length may, but need not necessarily, be provided with a part free from slate similar to the edge portion 9 in FIG. 3.

The technique using a heat-emitter according to the invention can also be utilized to secure roofing felt to the actual base surface 5 of the roof. In this case a suitable length of heat-emitter is placed on the base surface and then covered with a length of roofing felt so that the heat-emitter is located substantially in the middle of the length in its longitudinally direction. Alternatively several heat-emitters may be arranged beside each other. When a current is conducted through the heat-emitter it emits heat to the bitumen so that this softens and comes into adhesive contact with the surface below. When the bitumen solidifies it will form a firm joint between roofing felt and roof. Alternatively the heat-emitter may be joined to the roofing felt from the start, e.g. secured to the lower side of the roofing felt or enclosed in the roofing felt one or a few millimeters from the lower side.

It will be understood that the heat-emitter becomes a part of the Joint formed since the heat-emitter is enclosed in the solidified bitumen.

I claim:

1. A method of laying roofing felt on roofs, the roofing felt containing bitumen which is solid at ambient temperature and softens at a softening temperature above ambient temperature, and the roofing felt in the form of pieces with end edges, and utilizing a heat emitting member in the form of a metal strip with a plurality of openings for penetration of softened bitumen; said method comprising the steps of:

(a) providing a metal strip adjacent a first end edge of a first piece of roofing felt;

(b) overlapping the first end edge of the first piece of roofing felt with a second end edge of a second piece of roofing felt, so that the metal strip engages both the first and second pieces of roofing felt, the overlapped first and second edges with metal strip therebetween forming a joint area;

(c) applying a variable magnetic field to the joint area to induce a current of sufficient strength to cause the metal strip to be heated as a result of current passing therethrough to a temperature sufficient to soften the bitumen of both the first and second pieces of roofing felt in the joint area so that the softened bitumen flows into the openings in the metal strip; and (d) terminating application of the magnetic field and providing cooling of the softened bitumen after the practice of step (c) so that a tight continuous overlap joint is provided in the first and second pieces of felt at the joint area.

2. A method as recited in claim 2 comprising the further step (e) of, while the bitumen is still softened as a result of the practice of step (c), applying a compression force to the topmost of the pieces of felt at the joint area to assist in forcing softened bitumen into, and through, the openings in the metal strip, and to thereby assist in forming a tight continuous overlap joint.

3. A method as recited in claim 2 wherein step (e) is practiced by rolling a roller over the joint area, the roller having a sufficient mass to provide a sufficient compression force to assist in forcing bitumen through the openings in the metal strip, and form a tight continuous overlap joint.

4. A method as recited in claim 1 wherein step (c) is practiced so as to control the variable magnetic field in response to the temperature of the roofing felt prior to the practice of step (c), the quality of the roofing felt, and the size of the joint area, so that a sufficient but not overly excessive current is induced in the metal strip.

5. A method as recited in claim 1 wherein step (a) is practiced so as to provide the metal strip in the form of a metal net which is secured to the first piece of roofing felt adjacent the first edge thereof.

6. A method as recited in claim 1 wherein step (a) is practiced so as to provide the metal strip in the form of a metal tape which is secured to the first piece of roofing felt adjacent the first edge thereof.

7. A method as recited in claim 1 wherein step (a) is practiced so as to provide the metal strip in the form of a metal tape which having differently sized openings therein, and which is secured to the first piece of roofing felt adjacent the first edge thereof.

8. A method as recited in claim 1 wherein the metal strip has a uniform width dimension which is perpendicular to the first edge, and wherein steps (a) and (b) are practiced so as to provide a joint area that has a width dimension that is greater than the width dimension of the metal strip.

9. A method as recited in claim 1 comprising the further steps of (e) providing a second metal strip adjacent a third end edge of the first piece of felt and in contact with a roof base surface, the second metal strip between the first piece of felt and the roof base surface; (f) applying a variable magnetic field to induce a current of sufficient strength to cause the second metal strip to be heated as a result of current passing therethrough to a temperature sufficient to soften the bitumen of the first piece of roofing felt in the area of the second metal strip so that the bitumen flows through the openings in the metal strip into contact with the roof base surface; and (g) terminating application of the magnetic field and providing cooling of the softened bitumen after the practice of step (f) so that a tight continuous weld of the first piece of felt to the roof base surface is provided adjacent the second metal strip.

10. A method as recited in claim 1 wherein step (d) is practiced at least primarily by ambient cooling.

11. A method of laying roofing felt on a roof base surface, the roofing felt containing bitumen which is solid at ambient temperature and softens at a softening temperature above ambient temperature, and the roofing felt in the form of pieces with end edges, and utilizing a heat emitting member in the form of a metal strip with a plurality of openings for penetration of softened bitumen; said method comprising the steps of:

(a) providing a metal strip adjacent a first end edge of a first piece of roofing felt and in contact with a roof base surface, the metal strip between the first piece of felt and the roof base surface;

(b) applying a variable magnetic field to induce a current of sufficient strength to cause the metal strip to be heated as a result of current passing therethrough to a temperature sufficient to soften the bitumen of the first piece of roofing felt in the area of the metal strip so that the softened bitumen flows through the openings in the metal strip into contact with the roof base surface; and (c) terminating application of the magnetic field and providing cooling of the softened bitumen after the practice of step (b) so that a tight continuous bitumen weld of the first piece of felt to the roof base surface is provided adjacent the metal strip.

12. A method as recited in claim 11 comprising the further step (d) of, while the bitumen is still softened as a result of the practice of step (b), applying a compression force to the first piece of felt at the metal strip area to assist in forcing softened bitumen through the openings in the metal strip, and to thereby assist in forming a tight continuous bitumen welded joint between the first piece of felt and roof surface.

13. A method as recited in claim 11 wherein step (b) is practiced so as to control the variable magnetic field in response to the temperature of the roofing felt prior to the practice of step (c), the quality of the roofing felt, and the size of the metal strip, so that a sufficient but not overly excessive current is induced in the metal strip.

14. A method as recited in claim 11 wherein step (a) is practiced so as to provide the metal strip in the form of a metal net or a metal tape which is secured to the first piece of roofing felt adjacent the first edge thereof.

15. A joint between first and second pieces of roofing felt, the first piece having a first end edge, and the second piece having a second end edge, and both pieces of roofing felt containing bitumen which is solid at ambient temperature and softens at a softening temperature above ambient temperature, said joint formed by:

an overlapping area of said first and second end edges of said first and second pieces of roofing felt, forming a joint area; and a metal strip between said first and second end edges at said joint area, said strip having a plurality of openings therethrough, and bitumen from said first and second pieces of felt penetrating said openings and solidified in said openings so that a tight continuous overlap joint is provided in the first and second pieces of felt at the joint area.

16. A joint as recited in claim 15 wherein said metal strip is a metal net or metal tape and has a uniform width dimension which is perpendicular to said first edge; and wherein said joint area has a width dimension that is greater than the width dimension of the metal strip.

17. A method as recited in claim 2 wherein step (c) is practiced so as to control the variable magnetic field in response to the temperature of the roofing felt prior to the practice of step (c), the quality of the roofing felt, and the size of the joint area, so that a sufficient but not overly excessive current is induced in the metal strip.

18. A method as recited in claim 3 wherein step (c) is practiced so as to control the variable magnetic field in response to the temperature of the roofing felt prior to the practice of step (c), the quality of the roofing felt, and the size of the joint area, so that a sufficient but not overly excessive current is induced in the metal strip.

19. A method as recited in claim 4 wherein step (a) is practiced so as to provide the metal strip in the form of a metal net which is secured to the first piece of roofing felt adjacent the first edge thereof.

20. A method as recited in claim 2 wherein step (a) is practiced so as to provide the metal strip in the form of a metal net which is secured to the first piece of roofing felt adjacent the first edge thereof.

21. A method as recited in claim 4 wherein step (a) is practiced so as to provide the metal strip in the form of a metal tape which is secured to the first piece of roofing felt adjacent the first edge thereof.

22. A method as recited in claim 2 wherein step (a) is practiced so as to provide the metal strip in the form of a metal tape which is secured to the first piece of roofing felt adjacent the first edge thereof.

23. A method as recited in claim 2 wherein step (a) is practiced so as to provide the metal strip in the form of a metal tape which having differently sized openings therein, and which is secured to the first piece of roofing felt adjacent the first edge thereof.

24. A method as recited in claim 2 wherein the metal strip has a uniform width dimension which is perpendicular to the first edge, and wherein steps (a) and (b) are practiced so as to provide a joint area that has a width dimension that is greater than the width dimension of the metal strip.

25. A method as recited in claim 2 comprising the further steps of (f) providing a second metal strip adjacent a third end edge of the first piece of felt and in contact with a roof base surface, the second metal strip between the first piece of felt and the roof base surface; (g) applying a variable magnetic field to induce a current of sufficient strength to cause the second metal strip to be heated as a result of current passing therethrough to a temperature sufficient to soften the bitumen of the first piece of roofing felt in the area of the second metal strip so that the bitumen flows through the openings in the metal strip into contact with the roof base surface; and (h) terminating application of the magnetic field and providing cooling of the softened bitumen after the practice of step (f) so that a tight continuous weld of the first piece of felt to the roof base surface is provided adjacent the second metal strip.

26. A method as recited in claim 4 comprising the further steps of (e) providing a second metal strip adjacent a third end edge of the first piece of felt and in contact with a roof base surface, the second metal strip between the first piece of felt and the roof base surface; (f) applying a variable magnetic field to induce a current of sufficient strength to cause the second metal strip to be heated as a result of current passing therethrough to a temperature sufficient to soften the bitumen of the first piece of roofing felt in the area of the second metal strip so that the bitumen flows through the openings in the metal strip into contact with the roof base surface; and (g) terminating application of the magnetic field and providing cooling of the softened bitumen after the practice of step (f) so that a tight continuous weld of the first piece of felt to the roof base surface is provided adjacent the second metal strip.

\* \* \* \* \*